United States Patent
Geyer

(10) Patent No.: US 7,337,883 B2
(45) Date of Patent: Mar. 4, 2008

(54) LINEAR ELECTROMECHANICAL SCREW ACTUATOR FOR A PARKING BRAKE

(75) Inventor: Andreas Geyer, San Secondo di Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 81 days.

(21) Appl. No.: 11/297,995

(22) Filed: Dec. 8, 2005

(65) Prior Publication Data
US 2006/0169553 A1  Aug. 3, 2006

(30) Foreign Application Priority Data
Dec. 13, 2004  (IT) ................... TO2004A0871

(51) Int. Cl.
F16D 65/36 (2006.01)
F16D 55/08 (2006.01)
F16D 65/14 (2006.01)

(52) U.S. Cl. ................ 188/156; 188/2 D; 188/72.8
(58) Field of Classification Search ............. 188/72.8, 188/162, 265; 74/89.23, 89.36, 424.71, 421 R, 74/421 A; 475/338, 339
See application file for complete search history.

(56) References Cited

U.S. PATENT DOCUMENTS

| 4,804,073 A * | 2/1989 | Taig et al. ............... 188/72.1 |
| 5,148,894 A * | 9/1992 | Eddy, Jr. ................ 188/72.6 |
| 5,178,237 A * | 1/1993 | Ursel et al. ............. 188/106 P |
| 5,542,513 A * | 8/1996 | Reyes .................... 192/219.4 |
| 5,590,744 A * | 1/1997 | Belmond ................. 188/265 |
| 6,367,593 B1 * | 4/2002 | Siler et al. ............... 188/72.1 |
| 6,662,909 B2 * | 12/2003 | Taniguchi ................ 188/162 |
| 6,966,410 B1 * | 11/2005 | Tacker .................. 188/2 D |
| 7,070,026 B2 * | 7/2006 | Conti et al. .............. 188/266.7 |
| 2002/0100647 A1 * | 8/2002 | Miyakawa et al. ........ 188/162 |
| 2003/0051569 A1 * | 3/2003 | Kapaan et al. ........... 74/424.85 |

\* cited by examiner

Primary Examiner—Robert A. Siconolfi
Assistant Examiner—James K. Hsiao
(74) Attorney, Agent, or Firm—Merchant & Gould P.C.

(57) ABSTRACT

The actuator comprises a tubular nut (22) coupled by means of an external thread (21) to the casing (12) of the actuator. The nut has an internal thread (23) opposite the external thread, for engaging a threaded rod (11) which is prevented from rotating with respect to the casing. A geared motor (13, 14) rotates a pinion (15) which, through two straight spur gears (161, 162), causes the nut (22) to bring about a screwing movement along a longitudinal axis (x), while the rod (11) translates rapidly in telescopic manner with respect to the casing (12). The spur gears have a pinion portion of greater diameter (161a, 162a) meshing with the pinion (15), and a splined shaft portion (161b, 162b) meshing with a pinion member (22b) integral with the nut (22).

5 Claims, 2 Drawing Sheets

LINEAR ELECTROMECHANICAL SCREW ACTUATOR FOR A PARKING BRAKE

The present invention relates to a linear electromechanical screw actuator for a parking brake of a motor vehicle.

Instead of the conventional manually operated lever which imparts a traction movement to one or two Bowden cables connected to the parking brakes of a motor vehicle, it has recently been proposed to effect that traction movement by means of an electromagnetic actuator (see, for example, US-2002/0100647 A1).

It is an object of the invention to provide a compact linear actuator capable of imparting rapidly a traction movement to Bowden cables in a non-backdrivable manner (that is to say, capable of maintaining the imparted braking force in the absence of an unlocking command) and capable of exerting a high traction force.

Another object of the invention is to provide a strong and reliable linear actuator which is easy to mount and which is composed of a minimum number of components.

A further particular object of the invention is to provide an actuator which is such that, when the braking force is applied, the path of forces and reactions which passes through that actuator involves a minimum number of components.

These and other objects and advantages which will be better understood hereinafter are achieved according to the invention by an actuator according to the appended claims.

A description will now be given of the structural and functional features of a preferred but non-limiting embodiment of an actuator according to the invention; reference is made to the appended drawings, in which.

Figure 1:
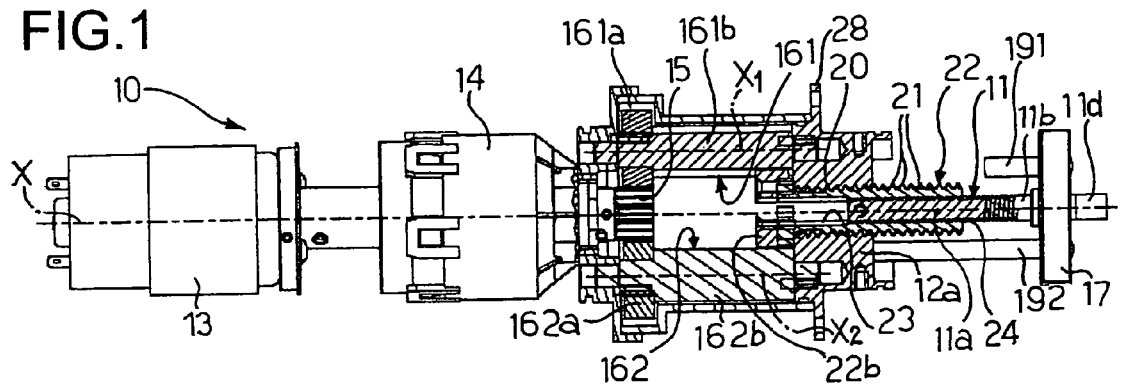
FIGS. 1, 2 and 3 are longitudinal cross-sectional views of an actuator according to the invention, shown in three different working positions.

With reference to the drawings, a linear electromechanical actuator according to the invention is generally indicated 10. The actuator 10 has an output rod 11 which is linearly translatable for operating one or more Bowden cables (not shown) controlling one or more parking brakes of a motor vehicle.

The actuator 10 has a substantially cylindrical overall shape defining a central longitudinal axis x which coincides with the direction of operation of the rod 11.

The actuator comprises an electric motor 13 with an associated gear reduction unit 14 whose rotary output member comprises a central pinion 15 which is rotatable about the central axis x of the actuator. The pinion 15 is part of an intermediate gear stage and meshes with a pair of elongate straight spur gears 161, 162 disposed parallel to and diametrically opposite with respect to the axis x. Each of the spur gears 161, 162 has a respective pinion portion of greater diameter 161a, 162a meshing with the central pinion 15, and a respective axially elongate splined shaft portion 161b, 162b of smaller diameter.

The spur gears 161, 162 are rotatably mounted about respective axes x1, x2 within a casing advantageously formed by joining a thin tubular portion 12b with a rigid, axially thickened portion 12a located towards the side of rod 11. The casing portion 12a forms an axial cylindrical seat having an internal thread 20 with which engages the external thread 21 of a tubular nut 22. As an alternative to the example illustrated, the internal thread 20 could be formed by a bush (not shown) fixed in the casing.

The tubular nut 22 is formed in one piece with or fixed to a base portion in the form of a straight spur gear pinion 22b that meshes with the splined shaft portions 161b, 162b of spur gears 161, 162, defining a final gear stage.

The nut element 22 has an internal thread 23 opposite the external thread 21 and coaxial therewith, and cooperates in threaded manner with the rod 11. The latter has an axially internal (or proximal) length 11a with a thread 24 congruent with the internal thread 23 of the nut, and an axially more external (or distal) length 11b having a non-circular cross-section.

A transversal disc plate designated 17 is fixed to the end portion of the rod 11. Plate 17 has a central opening 18 through which the distal length 11b of rod 11 extends, and two lateral axial apertures 181, 182. A pair of parallel axial guides 191, 192 fixed to the casing portion 12a slide through the apertures 181, 182. Plate 17 forms one connecting means or connecting seats, in this example two diametrically opposite axial bores 183, 184 (FIGS. 4 to 6) for connecting to respective Bowden cables (not shown).

Figure 4:
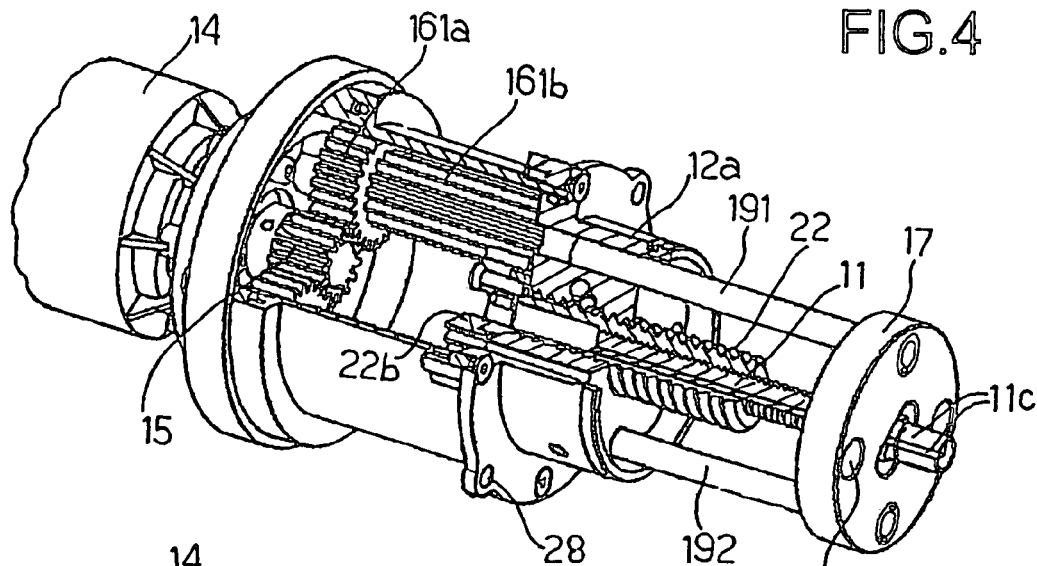
FIGS. 4, 5 and 6 are partially sectioned perspective views of the actuator of FIGS. 1, 2 and 3, respectively.
Figure 5:
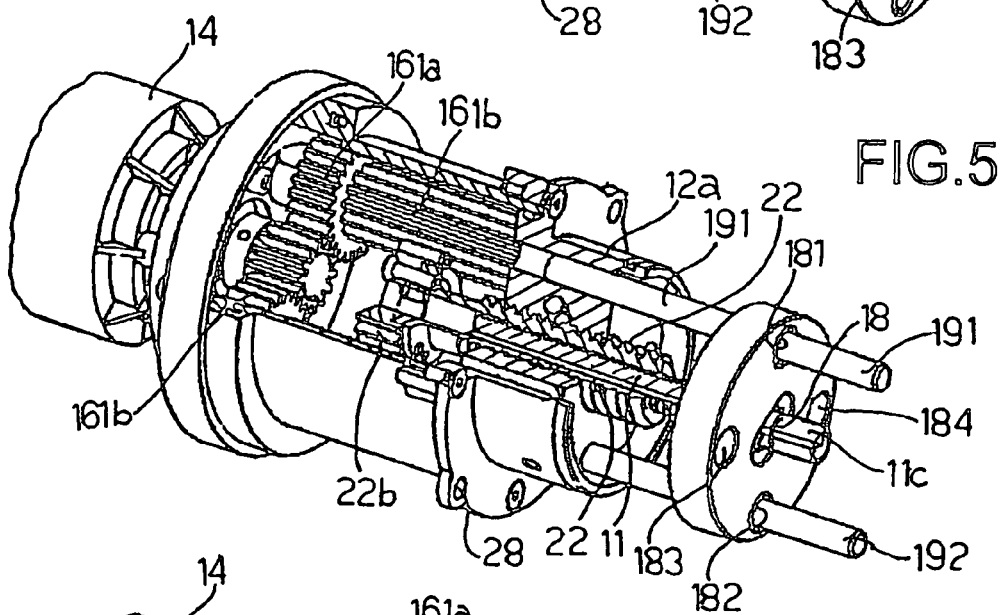
Figure 6:
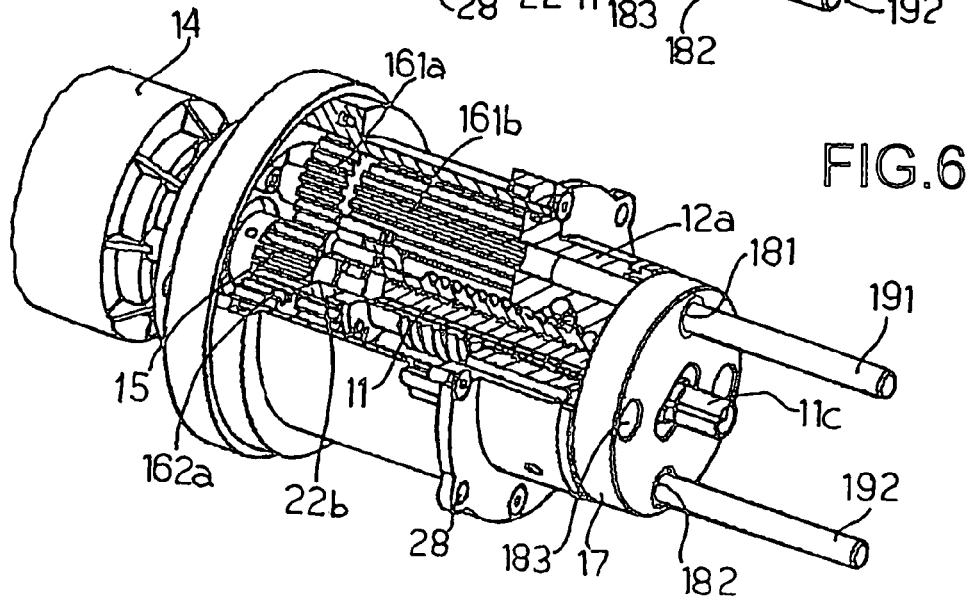

As can be seen in FIGS. 4 to 6, the distal portion 11b which extends through the opening 18 in the transverse plate 17 has one or more flat surfaces 11c. In order to prevent the rod 11 from rotating about the longitudinal axis of the actuator, the opening 18 has a transversal cross-section of non-circular shape corresponding to the cross-section of the distal portion 11b of rod 11.

Figure 2:
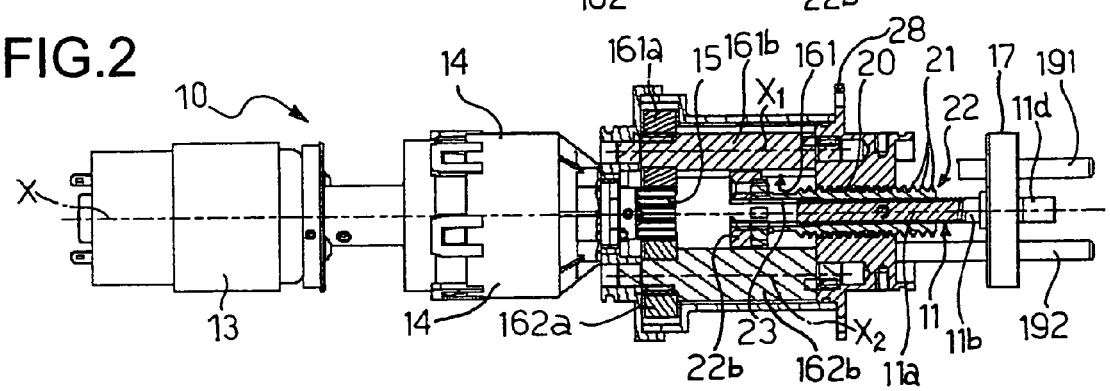
Figure 3:
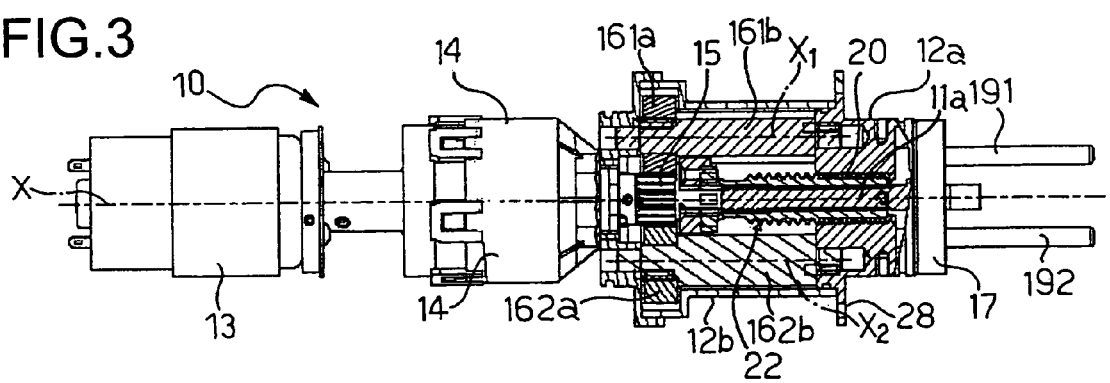

FIGS. 1 and 4 depict the actuator in a condition wherein the rod 11 is at a fully extended position. In FIGS. 3 and 6 the rod 11 is fully retracted. In FIGS. 2 and 5 the rod 11 is at an intermediate position.

Figure 7:
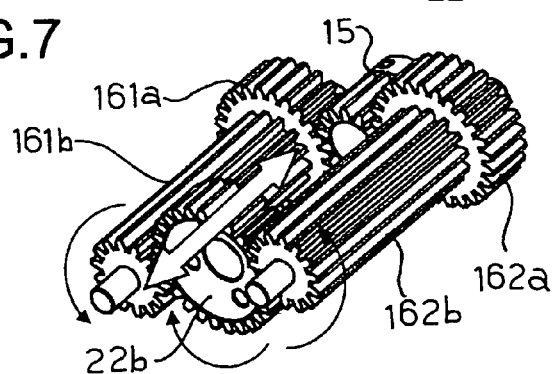
FIG. 7 is a perspective view of a drive assembly of the actuator.

Operation of the actuator is as follows. When the electrical motor 13 is activated, first gear stage 14 rotates the central pinion 15, and this causes the spur gears 161, 162 to rotate. Owing to the threaded coupling 20, 21 and the splined coupling with the spur gears 161, 162, the nut 22 performs a screwing movement about and along the longitudinal axis x, between an axially extended position (FIG. 1) and an axially retracted position (FIG. 3). The base portion 22b of the nut is guided axially by the same spur gears 161, 162 that drive it for rotation, and slides along them (FIG. 7). The splined shaft portions 161b, 162b have an axial length equal to or grater than the axial distance covered by the tubular nut 22 between the fully extended position of FIG. 1 and the fully retracted position of FIG. 3.

Owing to the first threaded coupling 20, 21 between the casing 12a and the nut 22, and the second threaded coupling 23, 24 (opposite to the first one) between the nut and the rod 11, the rotation of the nut brings about a rapid telescopic translation of the rod with respect to the casing, thus operating the Bowden cables which control the parking brakes of the vehicle.

Rotation of the rod 11 about the axis x is prevented by the plate 17, which translates axially along the fixed guides 191, 192 and engages in a non-rotatable manner (through the opening 18) the distal length 11b of non-circular cross-section.

It will be appreciated that, owing to the above described arrangement, the parking brakes can be activated rapidly, despite the fact that the threads 20, 21, 23, 24 have small angles of inclination (preferably less than 14° and more preferably of approximately 8°) in order to render the system non-backdrivable. It is desired that, owing to the wear between the mobile portions of the actuator, the rod should be capable of maintaining the retracted position reached and avoiding a situation where, in the absence of an operating command, the rod may be removed from the casing, for example if the vehicle is parked on a slope.

It is important to notice that the internal space of the casing intended to allow the axial stroke of the tubular nut is advantageously exploited for accommodating two gear reduction stages. In fact the spur gears 161, 162, besides guiding the nut axially, impart a driving torque to the nut which is multiplied twice due to the dual reduction carried out by the intermediate and final gear reduction stages. This allows to use an axially short first reduction unit 14, and therefore shorten the overall length of the actuator.

The reaction forces transmitted in return to the actuator during braking may be discharged to the outside (onto a fixed component of the vehicle) by way of a flange 28 formed by the rigid portion 12a of the casing. The path of the forces acting on the actuator when the latter is activated affects few members (the rod 11, the nut 22 and the casing portion 12a) and those forces are discharged to the outside of the actuator without stressing the reduction/drive units or the electrical motor. This is advantageous if it is considered that the braking forces (of the order of approximately 3600 N) would inevitably increase the clearance between the transmission members of the reduction unit and the motor, thus reducing the service life of the actuator. The small number of members affected by the braking forces instead defines a very short kinematic chain which guarantees the reliability of the actuator over time.

The invention is not intended to be limited to the embodiment described and illustrated herein, which should be considered as an example of an embodiment of the actuator; rather, the invention may be modified with regard to the shape and arrangement of parts and to constructional and functional details. For example, according to other not-illustrated embodiments, it is possible to provide a single spur gear instead of two. However, is preferable that the spur gears are at least in number of two or three, in order to balance the radial components of the forces and reactions in the intermediate and final reduction units. Finally, as an alternative to what is shown, one or more Bowden cables may be connected to the end portion lid of the rod by other means of connection, as will be apparent to those skilled in the art.

What is claimed is:

1. A linear electromechanical actuator of the screw type for controlling a parking brake of a motor vehicle, comprising:
    a stationary rigid casing fixable to a vehicle,
    a motor with an associated first gear reduction unit for imparting a rotational movement about a longitudinal axis to an output pinion,
    a tubular nut element having an external thread co-operating with a thread fixedly joined to the casing in order to make the nut perform screwing movements about and along said axis, and the tubular nut element having an internal thread opposite the external thread,
    drive means for transmitting a rotary motion from the output pinion to the nut,
    a longitudinal rod having a first threaded length which co-operates with the internal thread of the nut, and a second length having a non-circular transversal cross-section,
    connecting means for connecting the rod to at least one flexible cable for operating a parking brake,
    anti-rotation means co-operating between the casing and the second length of the rod to prevent the rotation of the rod about said axis, wherein the rod is translatable longitudinally along said axis in response to the rotary movement imparted by the motor;
    wherein said drive means include a first straight spur gear rotatable about a respective axis parallel to the longitudinal axis, and wherein said spur gear includes:
    a pinion portion of increased diameter meshing with the output pinion, and
    an axially elongate splined shaft portion meshing with a pinion member, wherein the pinion member is integral with the nut.

2. The actuator of claim 1, wherein said drive means comprise the first straight spur gear and a second straight spur gear rotatable about two respective axes parallel to the longitudinal axis, wherein each of said spur gears includes:
    a pinion portion of increased diameter meshing with the output pinion, and
    an axially elongate splined shaft portion meshing with a pinion member integral with the nut.

3. The actuator of claim 2, wherein said spur gears are spaced diametrically opposite with respect to the longitudinal axis.

4. The actuator of claim 1, wherein the pinion member integral with the nut is a straight spur gear pinion.

5. The actuator of claim 1, wherein the nut co-operates with the thread fixedly joined to the casing so as to perform a screwing movement about and along said axis between an axially extended position and an axially retracted position; and
    the splined shaft portion has an axial length equal to or grater than an axial distance covered by the nut in performing its screwing movement between said extended and retracted positions.

* * * * *